United States Patent [19]
Nicholson

[11] 3,953,665
[45] Apr. 27, 1976

[54] BUSHINGS, GROMMETS OR LIKE DEVICES

[75] Inventor: John Holt Nicholson, Ferndown, England

[73] Assignee: Plastic Seals Limited, England

[22] Filed: Oct. 15, 1974

[21] Appl. No.: 514,800

[30] Foreign Application Priority Data
Oct. 15, 1973 United Kingdom............... 48030/73

[52] U.S. Cl.............................. 174/153 G; 248/56
[51] Int. Cl.² ..................... F16L 5/00; H01B 17/26
[58] Field of Search.......... 174/65 G, 152 G, 153 G; 16/2; 248/56; 285/159, 162; 339/103 B; 403/197

[56] References Cited
UNITED STATES PATENTS 3,689,014  9/1972  Fink............................ 174/153 G X
3,779,494  12/1973  Nicholson et al........... 174/153 G X Primary Examiner—Laramie E. Askin
Attorney, Agent, or Firm—Brisebois & Kruger

[57] ABSTRACT

The invention relates to a strain relief bushing for electrical cables or the like, which comprises integrally and flexibly interconnected male and female body portions which, when assembled around a cable, and the assembly is pressed into a mounting aperture in a panel, releasably snap lock in an operative position in the aperture to insulate and anchor the cable with respect to the panel. The female body portion is provided with a substantially rigid rearward extension provided with secondary releasable snap-lock means which retain the bushing positively locked to the panel, when the bushing is not in its operative position, and a cable is being assembled to or dissassembled from the bushing.

8 Claims, 5 Drawing Figures

U.S. Patent    April 27, 1976    3,953,665
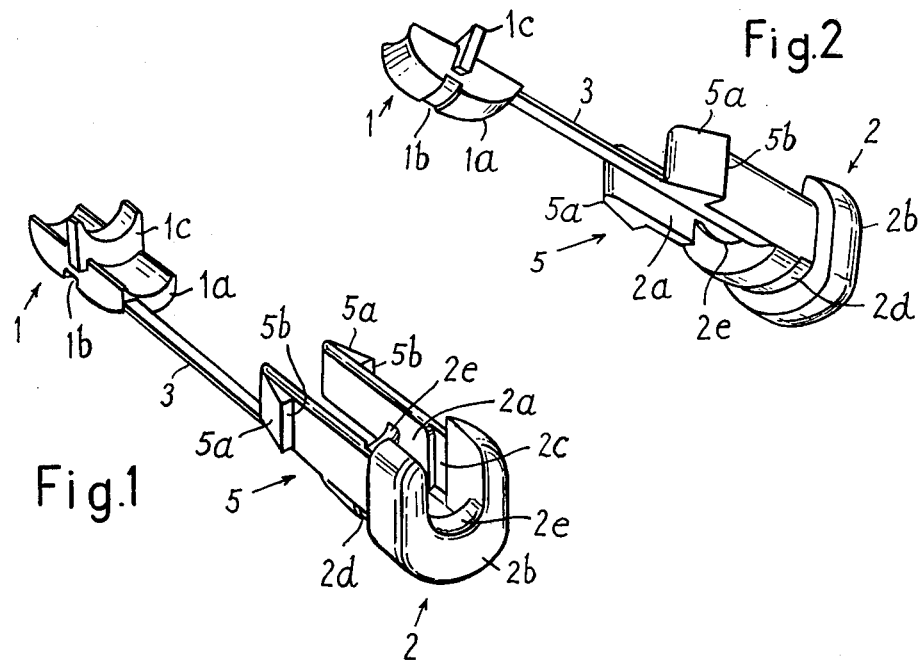
Fig.2
Fig.1
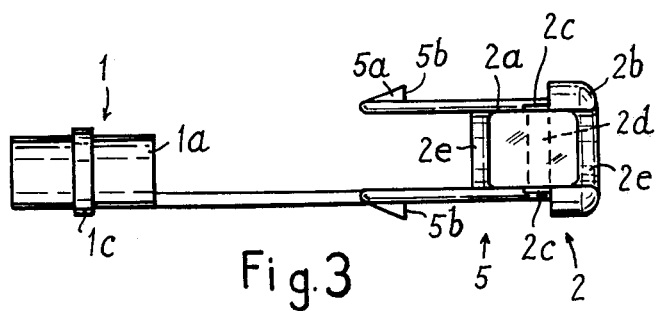
Fig.3
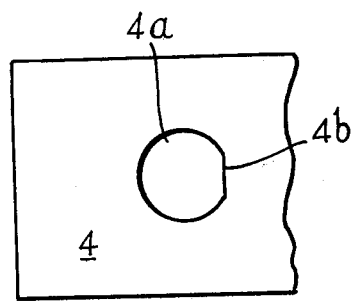
Fig.4
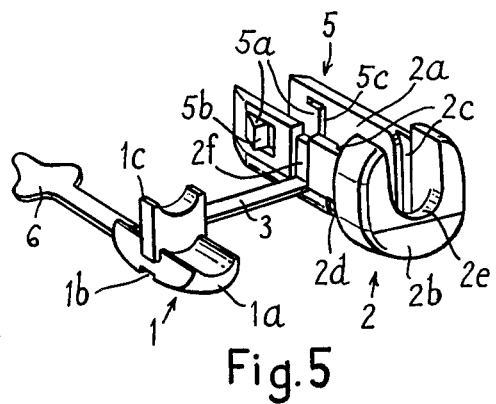
Fig.5

BUSHINGS, GROMMETS OR LIKE DEVICES

The present invention relates to a bushing, grommet or like device which is provided with a body portion, and locking means operable to releasably lock the body portion in an operative position in an aperture in a panel or other plate-like member. In this operative position, the device serves to insulate and/or mechanically protect from the member, an electrical conductor, cable or other elongate element passing through the aperture. Such a device will hereinafter be referred to as "a device of the type specified".

With prior devices of this type, for example electrically insulating bushings, it is generally far easier, if not essential, for the electrical cable comprising the elongate element to be fitted to or removed from the bushing if the bushing is separated from its associated aperture. Such separation possesses the disadvantage that the bushing may be mislaid. Furthermore, since the cross-section of the aperture must necessarily be larger than that of the cable in order that the aperture may accommodate both the cable and the surrounding bushing, it is possible, when the bushing is removed from the aperture, to insert into the aperture, a cable having a larger cross-section than that recommended or specified.

It is an object of the present invention to provide a device of the type specified which prevents or hinders the insertion into the aperture of an elongate element having a larger cross-section than that intended or recommended.

According to the present invention, the body portion of a device of the type specified is provided with first locking means, operable to releasably lock the body portion in its operative position within an aperture in the panel or other plate-like member, and second locking means, operable, when the body portion is not locked by the first locking means and the body portion is displaced from its operative position, to retain the body portion within the aperture whilst allowing displacement of the body portion within the aperture to a position in which an elongate element may be assembled to or dissassembled from the device.

Since the body portion remains within the aperture during assembly or removal of the elongate element, the body portion partially blocks the aperture, and thereby reduces the effective cross section of the aperture, thus limiting the maximum cross-section of an elongate element which may be inserted into the aperture. Furthermore, since the device is positively retained assembled within the aperture during assembly, removal or replacement of the elongate element, the risk of total separation of the device from the panel or other plate-like member, and consequential possible loss of the device, is substantially reduced or eliminated.

In order that the invention may be more readily understood, reference will now be made to the accompanying drawing, in which:

FIGS. 1 and 2 are perspective views, viewed from different angles, of an electrically insulating and strain relief bushing according to one embodiment of the invention;

FIG. 3 is a plan view of the bushing of FIGS. 1 and 2;

FIG. 4 is a fragmentary plan view of a panel having an aperture for receiving the bushing of FIG. 1; and FIG. 5 is a perspective view of a second embodiment of bushing.

Referring to FIGS. 1 to 3, and to FIG. 5, each of the two embodiments of strain relief bushing comprises male and female body portions 1 and 2 respectively, interconnected by a flexible hinge 3. The body portions 1 and 2 and hinge 3 may be molded integrally from a synthetic plastic material, such as Nylon.

The male body portion 1 comprises a longitudinally extending part 1a formed with a transverse slot 1b. Projecting from the part 1a, generally in alignment with the slot 1b, is a transverse wall 1c.

The female portion 2 is generally U-shaped in cross-section, so as to define a longitudinally extending slot 2a. At one end, referred to herein as its forward end, the body portion 2 is formed with an enlarged head 2b, and directly to the rear of and adjacent this head, the body portion is formed with a pair of internal opposed channels 2c, and with an external transverse slot 2d, beneath the body portion, generally in alignment with the internal channels 2c. Projecting upwardly from that internal surface of the body portion 2 which corresponds to the base of the U, are a pair of transverse walls 2e disposed on opposite sides of the channels 2c. One of these walls is formed by a portion of the head 2b, whilst the other wall is disposed rearwardly of the channels.

In use of the bushing so far described, an electrical cable (not shown) is laid into the body portion 2 through the slot 2a, and the hinge 3 is then folded over so that the body portion 1 is inserted, transverse wall 1c downwardly, into the slot 2a with the transverse wall 1c sliding in the channels 2c. The cable, where it bridges the two transverse walls 2e in the body portion 2, is engaged by the transverse wall 1c. The bushing with the cable therein is then inserted and pressed into the aperture 4a in the panel 4 shown in FIG. 4. During this insertion, the outer inclined surface of the body portion 1 slidingly and cammingly cooperates with the edge of the aperture 4a, and the body portion 1 is thus depressed into the slot 22, causing the transverse wall 1c to press against, and kink downwardly, the portion of the cable bridging the two transverse walls 2e in the body portion 2. The bushing is pushed fully home until the rear of the head 2b abuts the front of the panel 4, in which position the slots 1b and 2d enter the aperture 4a, allowing the body portions 1 and 2 to snap apart slightly due to the resilience of the kinked cable, so that the panel, at the edge of the aperture, is positively trapped in the slots 1b and 2d.

The slots 1b and 2d thus form locking means locking the bushing in this operative position in which the bushing surrounds and electrically insulates the cable from the panel 4, and also anchors the cable against unintentional longitudinal movement through the bushing and therefore the aperture. If it is desired to remove or replace the cable, or adjust the position of the cable, the body portion is depressed by hand (or by an appropriate tool) against the resilience of the cable to release the panel from the slots 1b and 2d, the bushing is bodily withdrawn from the aperture, and the body portion 1 then separated from the body portion 2 to release the cable.

Bushings of the type having the components so far described are well known, and for this reason will not be described in greater detail. For a more detailed description of bushings of the said type or similar type, reference should be made, for example, to British Pat. Nos: 635,089 and 905,577.

In such known types of bushings, the overall length of the body portion 2 approximates that of the body portion 1 to facilitate total withdrawal of the bushing from the aperture as previously described, when the bushing is released from its operative position. However, after such total withdrawal, the aperture is unobstructed, permitting a cable of larger than specified or recommended diameter, for example a diameter approximating that of the aperture, to be inserted into the aperture, and to be used without the interposition of any bushing. There is also a risk that the totally detached bushing may be mislaid or lost. These obviously undesirable possibilities are avoided by the present invention.

According to the embodiment of the invention shown in FIGS. 1 to 3, an extension 5 forms a rearward and integral continuation of the body portion 2, and this extension 5 is provided with second locking means comprising a pair of enlargements or projections 5a hereinafter referred to as fingers. Each finger is provided with a laterally outwardly projecting locking shoulder 5b facing in a direction generally towards the head 2b, and has an inclined outer camming surface.

In the embodiment of FIGS. 1 to 3, the extension 5 comprises only extensions of the side limbs of the U of the body portion 2, and these generally flat, blade-like extensions are resilient, thus imparting resilience to the fingers 5a in a direction transversely of the body portion 2. The hinge 3 is integral with, and projects longitudinally and rearwardly, from the rear lower corner of one of the blade-like side limb extensions.

In use of the bushing shown in FIGS. 1 to 3, the hinge 3 is firstly folded over upwardly and forwardly so that the body portion 1 generally overlies the body portion 2, and the rear end of the extension 5 of the body portion 2 is then inserted into the aperture 4a. As the body portion 2 is initially pressed rearwardly, the edge of the aperture 4a engages the inclined camming surfaces of the fingers 5a, resiliently deflecting the fingers and the blade-like side limb extensions of the body portion 2 inwardly until the edge of the aperture passes forwardly off the inclined surfaces, releasing the fingers and allowing them to snap resiliently outwardly of the aperture behind the panel 4. In this condition, any attempt to simply withdraw the body portion 2 from the aperture is positively prevented by engagement of the locking shoulders 5b with the rear surface of the panel, unless the fingers are deliberately depressed toward each other. With the panel 4 located against or adjacent the locking shoulders, the cable is passed through the aperture and the open slot 2a in the body portion 2. In this position, the hinge 3, which also extends forwardly through the aperture 4a is folded over further to insert the body portion 1 into the slot 2a of the body portion 2 as previously described. The assembled bushing is then pushed fully home as previously described, until the head 2b abuts the front face of the panel 4 and the body portions 1 and 2 snap apart slightly to lock the bushing in its operative position with the panel locked in the slots 1b and 2d.

When it is desired to remove, replace or adjust the cable, the body portion 1 is depressed to release the panel from the slots 1b and 2d, and the bushing is drawn forwardly relative to the panel 4 until the panel is clear of the body portion 1, the extent of the withdrawal being positively restricted by abutment of the panel and locking shoulders 5b of the fingers 5a. In this position the body portion 1 may be removed, but since the body portion 2, or at least the extension 5 thereof, is still located within and partially blocks the aperture 4a only replacement cables of a cross-sectional size less than the internal cross-sectional size of the body portion 2 can be passed through the aperture.

One or both of the external side faces of the body portion 2 and the extension 5 thereof may be flattened as shown, so as to cooperate with one or more flats 4b formed on the edge of the aperture 4a. This cooperation locks the bushing against rotation relative to the aperture.

Since the hinge 3 is longitudinally aligned with one of the blade-like side limbs of the extension 5, and has a width equalling or approximating the thickness of the side limb, the hinge does not obstruct or otherwise hinder insertion or removal of the bushing relative to the aperture 4a, nor assembly or removal of the cable with respect to the bushing.

The bushing shown in FIG. 5 differs from that of FIGS. 1 to 3 in that the extension 5 comprises an extension of the base of the U of the body portion 2 as well as of the side limbs thereof. In order to impart transverse resilience to the fingers 5a relative to the relatively rigid extension 5, the extension 5 is slotted as shown at 5c. In this embodiment, the hinge 3 is formed integrally with, and projects laterally from, one of the side limbs of the U of the body portion 2, forwardly of the extension 5, or at least forwardly of the fingers 5a thereof.

In use of this bushing, the rear end of the extension 5 of the body portion 2 is firstly inserted into the aperture 4a until the fingers 5a, deflected inwardly by the edge of the aperture, snap out behind the panel 4, thus locking the bushing to the panel. In this position, there is sufficient clearance forwardly of the panel 4 for the hinge 3 to be folded over and the body portion 1 inserted into the slot 2a after insertion of a cable, as previously described. The assembled bushing is then pushed fully home into its operative position as described. When the aperture 4a in the panel is formed with one flat 4b as shown, the body portion 2 when inserted, is preferably oriented with the side face to which the hinge 3 is connected directed away from the flat 4b so that there is sufficient clearance between the curve of the aperture 4 and the said side face of the body portion 2 to accommodate the hinge 3 during movement of the bushing between its operative and inoperative positions within the aperture. However, in order to increase this clearance, or to permit the bushing to be employed with apertures formed with two diametrically opposed flats 4b or to allow the bushing to be oriented so that the side face to which the hinge 3 is connected faces towards the single flat 4b, the said side face is provided with a recess 2f into which the hinge 3 may be depressed during said movement of the bushing.

According to a feature of the embodiment of FIG. 5, (which may also be incorporated in the bushing of FIGS. 1 to 3) means are provided to enable the bushing to be employed with, and anchor securely, cables of differing cross-sections. In this respect, a cruciform flexible shim strap 6 is formed integrally with, and projects longitudinally rearwardly of, the body portion 1. When a cable of the maximum recommended cross-section which the bushing will accommodate is to be employed, the bushing is assembled as previously described leaving the strap projecting rearwardly as shown. However, with significantly smaller cross-section cables, it will be appreciated that the degree of kinking of the cable achieved by the transverse walls of the two body portions will be reduced and may be insufficient to lock adequately the cable against longitudinal movement through the bushing, or snap-lock the bushing in its operative position. In this case, the cruciform strap 6 is flexed in the direction of the arrow until the cross piece of the strap lies on the arcuate upper end of the transverse wall 1c to increase the effective height of this wall.

The body portion 1 is then inserted into the body portion 2, as previously described, with the strap 6 retained in this position, and since the extent by which the wall 1c projects downwardly into the body portion 2 is increased by the thickness of the strap 6, the deformation of the cable will be correspondingly increased.

It will be understood that various modifications may be made without departing from the scope of the present invention. For example, the flexible hinge 3 and/or shim strap 6 may be omitted, may take other forms, or may be secured, for example integrally, to other parts of one or other body portions, and the body portions may take other forms. The manner in which the bushing is locked in its operative position may be modified, for example locking fingers or arms similar to the locking fingers 5a may be employed instead of, or in addition to, the slots 1b and 2d. Similarly, the manner in which the bushing is locked in its inoperative position may be modified, for example, the number and/or position and/or configuration of the locking fingers 5a may be changed, or the fingers may be replaced by other equivalent means serving permanently or releasably to retain one or other of the body portions located within, or otherwise blocking, the aperture, when displaced from its operative position.

The extension 5 in either embodiment may be tubular or part tubular along at least a part of its length, this being achieved by bridging the upper and lower longitudinal edges of the side or upright limbs thereof.

The invention may be applied to bushings, grommets or the like devices other than the particular type of strain relief bushing specifically described and illustrated. For example, the invention may be applied to bushings of the type forming the subject of British Pat. Nos: 933,933 or 635,086 or to the well known type of simple one piece annular grommet having a circumferentially continuous channel in its outer periphery. The invention is not restricted to bushings or grommets for insulating or protecting electrical cables or other conductors from panels through which they pass, but is equally applicable to bushings or grommets for use in conjunction with cords, tubes, or other elongate elements not serving an electrical function, which pass through apertures in panels or the like.

I claim:

1. A bushing comprising a body portion which at least partially defines an elongate member-receiving passage extending generally longitudinally through the bushing, the body portion being provided with first locking means, operable to releasably lock the body portion in an operative position within an aperture in a plate-like member when the bushing is inserted generally longitudinally into the aperture, in which position the bushing is operable to locate an elongate member, when received in and extending through said passage, with respect to the plate-like member, the leading end of the body portion, in the generally longitudinal direction of insertion of the body portion into the aperture in the plate-like member, including at least two blade-like members extending along opposite sides of, and partially defining, said passage, said blade-like members being provided with second locking means, operable when the body portion is not locked by the first locking means and the body portion is displaced generally longitudinally from its operative position, to retain said blade-like members of the body portion within and partially obstructing the aperture whilst allowing displacement of the body portion within the aperture to a position in which an elongate element may be assembled to or disassembled from the bushing.

2. A bushing as claimed in claim 1, wherein the body portion includes two longitudinally distributed integral zones, one of which is formed by said blade-like members and the other of which is a zone which is located within said aperture when the bushing is in its operative position and which, when in this position, is adapted to electrically insulate an elongate element comprising an electrical cable from the plate-like member, the blade-like members forming continuations of portions of the electrically insulating zone and being of substantially the same thickness as said portions, and wherein the blade-like members are substantially rigid and formed with at least one locking shoulder directed away from the free leading end of the body portion, said at least one locking shoulder comprising the second locking means.

3. A bushing as claimed in claim 2, wherein said body portion comprises a female body portion moulded from a resilient and electrically insulating synthetic plastic material, to a generally U-shaped cross-section, to define a longitudinally extending cable-receiving channel therein forming part of said passage, the blade-like members forming integral continuations of the portions of the electrically insulating zone which define the two side limbs of the U of the female body portion, which continuations are each formed with an integral external tapered projection defining said locking shoulder, the bushing further including a male body portion which also defines part of said passage, and is cooperable with the channel in the electrically insulating zone of the female body portion to anchor a cable between the body portions when the bushing is in its operative position, at least one of the male and female body portions being provided with an external transverse groove comprising the first locking means, said first locking means, in said operative position, being longitudinally spaced from the second locking means, in a direction away from the said free leading end, by a distance not less than the length of the male body portion, thereby to permit insertion and removal of the male body portion when the latter is locked to a plate-like member by the second locking means.

4. A bushing as claimed in claim 3, wherein the male and female body portions are interconnected by an integral flexible hinge.

5. A bushing as claimed in claim 4, wherein said hinge is integrally connected to the free leading end of one of the blade-like members, the hinge forming a longitudinally extending continuation of said blade-like member and having a width approximating the thickness of said blade-like member.

6. A bushing as claimed in claim 5, wherein two spaced, resilient, substantially flat and straight, blade-like members are provided, forming continuations of respective ones of the portions of the electrically insulating zones which define said two side limbs, the two blade-like members being deflectable towards each other to release the second locking means, said second locking means comprising a wedge-shaped projection externally of, and defining a locking shoulder on, each of the blade-like members.

7. A bushing as claimed in claim 5, wherein two spaced, substantially flat and straight blade-like members are provided forming continuations of respective ones of the portions of the electrically insulating zone which define the two side limbs, said blade-like members being bridged and rigidified by an integral member forming a continuation of the base of the U, and wherein said second locking means comprise external fingers defining locking shoulders integrally resiliently connected to the blade-like members.

8. A bushing as claimed in claim 5, including means to enable the bushing to anchor cables of differing cross-sectional dimensions, said means comprising a shim strap, integral with the male body portion, and having regions of differing width which are selectively cooperable with the male body portion, when cooperating with the channel in the female body portion, to vary the effective cross-section of the cable-receiving passage defined between the channel and male body portion.

* * * * *